United States Patent Office 3,306,349
Patented Feb. 28, 1967

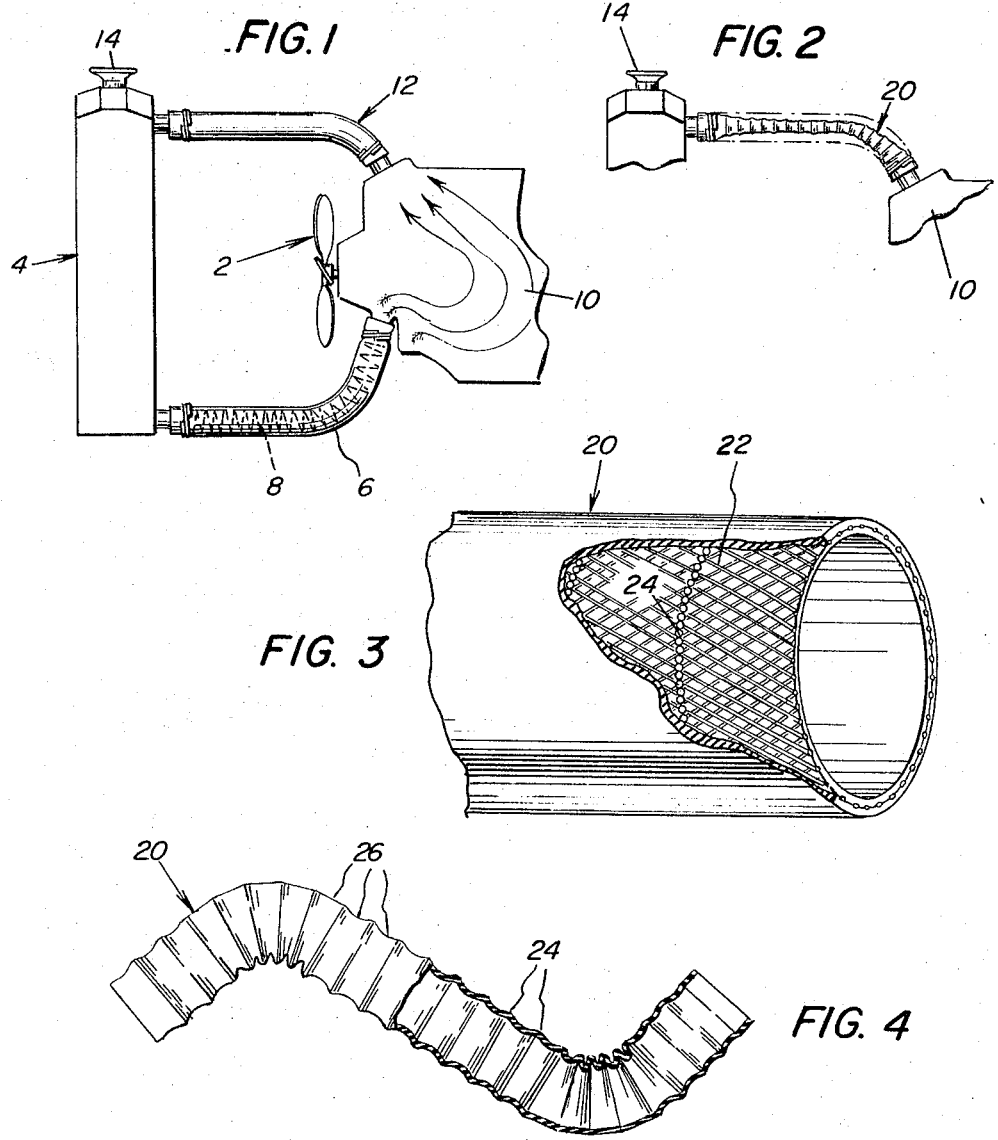

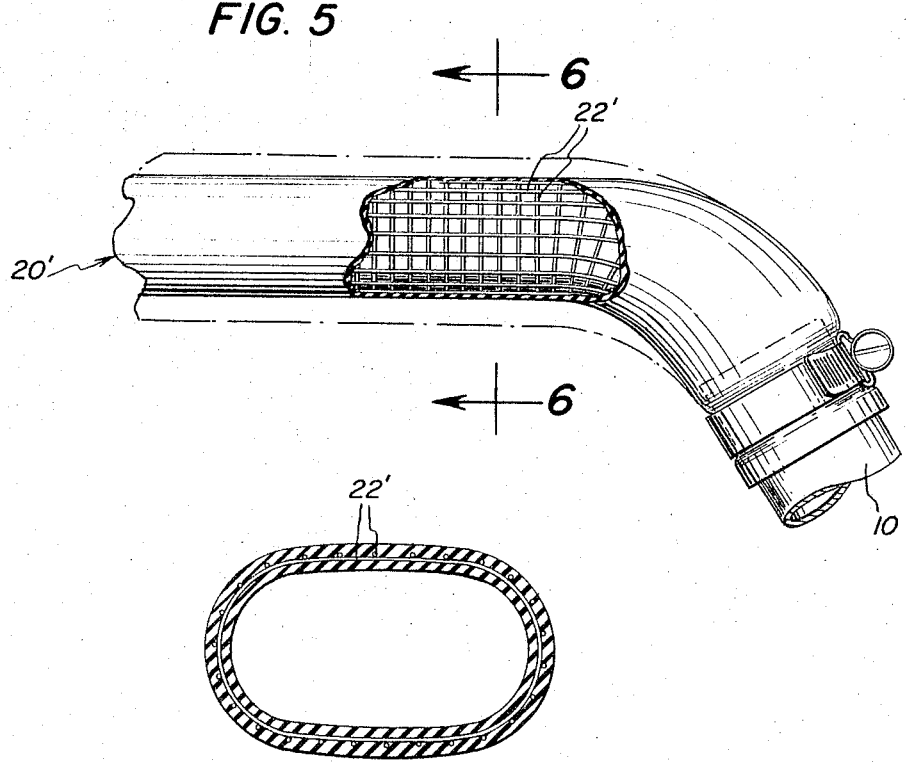

3,306,349
AUTOMOTIVE COOLANT SYSTEM WITH
VACUUM RELIEF DEVICE THEREIN
Allie B. Holmes, 4824 Ayers,
Corpus Christi, Tex. 78415
Filed Feb. 23, 1966, Ser. No. 529,368
7 Claims. (Cl. 165—51)

This invention is concerned with an improved vacuum relief device for inclusion in a conventional automotive cooling system. It pertains to the use of a tube-like structure which is sensitive to vacuum changes, and which can readily absorb a vacuum, thereby relieving stress and strain to other parts of the cooling system. This is related to my copending patent application Serial No. 509,503, filed November 24, 1965, entitled, Expandible Element and Sealed Coolant System, and is a continuation-in-part of my copending patent application Serial No. 523,757, filed Jan. 28, 1966, and entitled, Improved Vacuum Relief Device.

It is therefore an object of this invention to provide an improved relief device, to back up present devices, that will sustain operating pressures on the one hand and prevent the creation of a damaging vacuum, should the vacuum valve fail partially or altogether.

It is another object of invention to provide a tubular pressure sustaining and vacuum relief device, which may easily be attached to conventional cooling systems.

It is another object of invention to provide an automotive tubular vacuum relief device for coolant systems that can collapse to absorb a vacuum but cannot expand, upon pressure build-up from its normal radial diameter, preserving thereby, associated components against excessive stress.

These and other objects of invention will be apparent from the following specification and drawings in which:

FIGURE 1 is a block diagrammatic view of a conventional automotive cooling system;

FIGURE 2 is a view of one form of the inventive tubular vacuum relief device, contracted operatively from its normal radial diameter, the phantom lines indicating the normal diameter;

FIGURE 3 is a fragmentary view of the tubular vacuum relief device of FIGURE 2;

FIGURE 4 is a side view part in fragment of the tubular relief device of FIGS. 2 and 3, illustrating partial deformation due to the creation of a vacuum within;

FIGURE 5 illustrates a preferred form of tubular relief device;

FIGURE 6 is a vertical sectional view of FIGURE 5 taken along the lines 6—6 thereof.

Conventional cooling systems are protected from overpressure by pressure caps, which are usually spring-biased. The pressure cap functions as a seal, which is broken when internal pressure created by heat expansion of the coolant increases to a predetermined value. Conventional pressure caps are also equipped with a secondary seal or valve, which opens the system to the atmosphere upon shrinkage of the coolant as it cools from its normal operating temperature of 160–180° F. to ambient temperature. This secondary valve thus prevents the creation of a vacuum within the system, which may strain and thereby cause damage to and leakage between the various conductors and functioning elements of the system. This secondary relief valve normally comprises mechanical arrangements which often malfunction due to foreign matter forming thereon. If set to operate at a too low a predetermined vacuum, the cooling system could still be damaged.

Specifically, a cooling system normally comprises a radiator, pump, water jacket, pressure cap, and connective hoses. These elements are rigid, so that pressure may be created and coolant circulated during the normal operating temperture range. That is, these elements are not normally made resilient in a radial direction, as pressure or vacuum conditions are created within the system. In practice they may "fatigue," but this creates a weakness resulting in an inability to sustain desirable operating pressures. Conventional hoses are thus designed in accordance with a fixed length, shape and diameter. The inside hose diameter is determined by the amount of coolant that must necessarily be circulated in order to achieve proper cooling of the system. The length is determined by the distance of various elements to be interconnected, and the shape is determined by the available route between connections, which often is not straight. Furthermore, conventional hoses are usually formed from hard rubber, reinforced with fiber cloth or metal wire, and molded integrally to form a hollow tube of the desired size, shape and strength. While being flexible from end to end, conventional hoses are semi-rigid radially and retain their normal or original diameters despite the effect of pressure changes within, because of the hardness and thickness of the rubber, which is further fortified by the integrally molded reinforcing fiber or wire. These factors combine to give necessary strength to contain the coolant, and to withhold pressure. They also insure that conventional hoses maintain their normal diameter, but they are thus unresponsive to the creation of a vacuum within the system. Since they are not responsive to variations from partial to full vacuum, as a consequence a sealed coolant system has been impracticable, up to the present.

As indicated, present vacuum relief element is radially responsive to the creation of a vacuum within the system, but is not radially responsive to the creation of above-normal pressures. That is, it can only shrink progressively from its normal preselected diameter.

FIGURE 1 illustrates the conventional elements of a cooling system. Pump 2 circulating coolant from radiator 4 through suction hose 6, which is equipped with the usual anti-collapse interior coil spring 8. As is known, this prevents suction developed by pump 2 from cutting off its own intake at high engine r.p.m. The coolant is thus forced through the engine cooling jacket 10, and is conveyed under pressure back to radiator 4 through upper radiator hose 12. All of the conventional elements are of a semi-rigid nature, and fixed size. Although distortion and weakening of the flexible conductors may occur through rubber fatigue, it is not generally accepted that its fatigue is a desirable characteristic of the overall system. Fatigue, per se, is to be avoided by replacement of these hoses. Because of their radial rigidity, heat induced expansion of the coolant during engine operation causes internal pressure that may exceed the system's rated capacity. If so, pressure cap 14 unseals to exhaust the overpressure, and some coolant more often than not.

Now, as the coolant temperature decreases, for example upon idling the engine or shutting it off, an interior vacuum is created within the system. Ordinarily, a vacuum relief valve located in cap 14 opens inwardly from the atmosphere to relieve this vacuum, and thereby to relieve the semi-rigid engine elements and their connections from stresses and strains created by the vacuum. However, if the vacuum valve sticks or malfunctions, thereby failing to relieve the interior vacuum of the system, the radiator tank or other rigid members are often subjected to stresses and strains that seriously damage them, in rupturing or breaking their connections between engine and radiator. Additionally, if the vacuum relief valve does function, loss of coolant by vapor and/or liquid results.

This invention prevents this damage to these rigid conductors and the cooling system generally, such as may be caused by a malfunction or inoperativeness of the vacuum relief valve. FIGURE 2 shows, for example, the structure of the unitary vacuum relief device 20. Device 20 functions simultaneously as the upper radiator hose, conducting coolant from the water jacket to the radiator, as well as to counteract and contain or absorb any vacuum created within the overall system by reduction in the operating temperature of the engine coolant. Tube 20 comprises a soft durometer pliable rubber, which is vulcanized or bonded conventionally to reinforcing material 22. See FIG. 3. Material 22 comprises a fiber or metallic fabric which is preferably woven for strength and flexibility, so that it cannot permit the tube to expand from its normal diameter. The outer circumference of the tube is restricted against expansion.

In this FIGURE 2 modification, the fabric reinforced rubber tube 20 is further reinforced by a plurality of collapsible bands or link chains 24, located intermittently along the length of the tube 20 as illustrated in FIG. 3, to prevent expansion of tube 20 in an outward radial direction from the normal, despite pressure increases within the tube. These limiting means 24 may be wound helically as well as spaced at right angles to the axis as shown. Chains 24 will collapse when a vacuum is created within the cooling system, thereby enabling the tube or hose 20 to readily contract from its normal position. Ideally, the durometer hardness of the rubber hose is such as to permit facile collapse of the combined fabric 22 and chain reinforcements 24, but the hose is of sufficient tensile strength to resist distortion or blow-out upon the creation of operating pressures within the system.

Fiber or metallic flexible cords or cables may be substituted for chains 24 to prevent expansion of the hose 20 in the outward radial direction. However, they do permit complete contraction of the hose in the radial direction because of their collapsibility.

Whereas FIG. 2 illustrates by phantom lines the collapsed position of the hose 20 when it is being used to absorb a vacuum created within the system, FIG. 4 illustrates the pliability and formability of hose 20. The hose by nature can be made to fit into a plurality of different cooling systems. Partially collapsed areas 26 between peaks 24' illustrate the initial phase of contraction of the hose in the inward radial direction, upon the creation of a vacuum. See FIG. 4. As contraction continues, the hose will assume the position illustrated in FIG. 2, because the chains 24 will finally collapse. The amount of contraction depends, of course, upon the vacuum created within the cooling system.

In FIG. 5 the broader application of the principle is shown. Here a simple fabric reinforcement 30 to the tube 20' is provided to effect the desired result. For example, a highly resilient mesh 22' carefully embedded in a matrix tube 20' of deformable rubber insures against expansion and excessive contraction or collapse. The mesh or fabric is preselected to permit partial and full collapse of the tube upon the creation of vacuum. It may be cloth, plastic or metal, the respective mesh elements being either bonded or not bonded, depending upon the need. In this view a partial collapse and distortion is noted by the difference in cross section between the phantom line and outline. The same is more clearly shown in FIG. 6.

It will be apparent to those skilled in the art that the essence of invention lies in providing a deformable, resilient, coolant conductor, deformable in the presence of vacuum or partial vacuum to contract and thereby relieve stress upon other elements comprising the overall coolant circuit and their respective connections. Expansion being prevented beyond the normal diameter insures satisfactory operating pressures of the coolant, as will be apparent. Various other means of accomplishing this result may be adopted without departing from the spirit of invention as set forth in the appended claims.

I claim:
1. In engine cooling systems wherein a coolant is circulated from engine to radiator, a vacuum relief device comprising:
  A. a flexible coolant conductor interposed between engine and radiator for circulating coolant to said system, said conductor including:
    (1) a tube which is deformable inwardly in the radial direction for contraction from its normal size and shape upon the creation of a vacuum within said system as the coolant may vary in temperature; and
    (2) at least one limiting reinforcement means, which is integral with said tube, said reinforcement means being contractible and non-expansible of said conductor in a radial direction from its normal dimension and shape, to relieve stress upon associated elements within the cooling system.

2. The fluid cooling system as described in claim 1 wherein the limiting reinforcement means is a mesh, the respective elements of the mesh being independent of each other.

3. The fluid cooling system as described in claim 1 wherein the limiting reinforcement means is a mesh, the respective elements of the mesh being bonded to each other.

4. The fluid cooling system as described in claim 1 wherein the limiting reinforcement means comprises plural bands located intermittently along said tube.

5. The fluid cooling system of claim 1 wherein the limiting reinforcement means comprises a mesh and plural bands disposed about said mesh, said bands being contractible radially.

6. The cooling system of claim 5 wherein the tube defines a matrix for the mesh and bands.

7. The tube, according to claim 6, wherein the mesh is woven and the bands comprise chains.

References Cited by the Examiner

UNITED STATES PATENTS

| 2,878,794 | 3/1959 | Stromberg | 123—41.27 |
| 3,076,479 | 2/1963 | Ottung | 123—41.5 X |
| 3,139,073 | 6/1964 | White et al. | 123—41.5 X |
| 3,208,438 | 9/1965 | White | 165—83 X |

MEYER PERLIN, *Primary Examiner.*

M. A. ANTONAKAS, *Assistant Examiner.*